(12) United States Patent
Chen et al.

(10) Patent No.: US 7,332,562 B2
(45) Date of Patent: Feb. 19, 2008

(54) BIODEGRADABLE LINEAR RANDOM COPOLYESTER AND PROCESS FOR PREPARING IT AND USE OF THE SAME

(75) Inventors: Wei Chen, Beijing (CN); Guixiang Zhu, Beijing (CN); Xirong Chen, Beijing (CN); Jinglan Lu, Beijing (CN); Yanxia Zhang, Beijing (CN); Yifan Yan, Beijing (CN); Wei Zhang, Beijing (CN)

(73) Assignees: China Petroleum & Chemical Corporation, Beijing (CN); Beijing Research Institute of Chemical Industry, Beijing (CN)

( * ) Notice: Subject to any disclaimer, the term of this patent is extended or adjusted under 35 U.S.C. 154(b) by 0 days.

(21) Appl. No.: 11/312,373

(22) Filed: Dec. 21, 2005

(65) Prior Publication Data

US 2006/0142536 A1 Jun. 29, 2006

(30) Foreign Application Priority Data

Dec. 23, 2004 (CN) .................. 2004 1 0101545
Dec. 23, 2004 (CN) .................. 2004 1 0101547
Dec. 30, 2004 (CN) .................. 2004 1 0103527

(51) Int. Cl.
| | |
|---|---|
| C08G 63/00 | (2006.01) |
| C08G 63/02 | (2006.01) |
| C08G 63/16 | (2006.01) |
| C08G 63/18 | (2006.01) |
| C08G 63/66 | (2006.01) |
| C08F 2/44 | (2006.01) |
| C08K 3/10 | (2006.01) |

(52) U.S. Cl. .............. 528/275; 528/276; 528/279; 528/281; 528/285; 528/298; 528/300; 528/302; 528/307; 528/308; 528/308.6; 524/780; 524/783; 428/364; 428/480

(58) Field of Classification Search ............. 528/275, 528/278, 279, 281, 285, 298, 300, 302, 307, 528/308, 308.6, 30; 524/780, 783; 428/364, 428/480

See application file for complete search history.

(56) References Cited

U.S. PATENT DOCUMENTS

| 5,817,721 A | 10/1998 | Warzelhan et al. |
|---|---|---|
| 5,889,135 A | 3/1999 | Warzelhan et al. |
| 6,018,004 A | 1/2000 | Warzelhan et al. |
| 6,046,248 A | 4/2000 | Warzelhan et al. |
| 6,114,042 A | 9/2000 | Warzelhan et al. |

FOREIGN PATENT DOCUMENTS

| CN | 1446837 A | 10/2003 |
|---|---|---|
| DE | 199 23 053 A1 | 6/2000 |
| EP | 0 626 406 A2 | 11/1994 |
| EP | 0 626 425 A2 | 11/1994 |
| EP | 1 106 640 A2 | 6/2001 |
| JP | 2004-18674 A | 1/2004 |
| KR | 9709332 B1 | 6/1997 |

*Primary Examiner*—Nathan M. Nutter
(74) *Attorney, Agent, or Firm*—Birch, Stewart, Kolasch & Birch, LLP (57) ABSTRACT

The present invention relates to a biodegradable copolyester of high molecular weight and narrow molecular weight distribution. The copolyester has a $M_w$ of 100,000-600,000 g/mol, and a molecular weight distribution of 1.2-3. The process for synthesizing the polyester comprises the steps of: 1) adding the following monomers and an optional catalyst component Cat1 to carry out interesterification and/or esterification: (a) aromatic dicarboxylic acid, ester thereof, anhydride thereof, or mixture thereof, (b) aliphatic diol, alicyclic diol or mixture thereof, and (c) aliphatic dicarboxylic acid, alicyclic dicarboxylic acid, ester thereof, anhydrides thereof, or a mixture thereof; 2) prepolymerizing the reaction system under vacuum; and adding a catalyst component Cat2 to the prepolymerized product; wherein the catalyst component Cat1 is selected from the group consisting of the compounds of Ti, Sb and Zn, and mixtures thereof; and the catalyst component Cat2 is selected from the compounds of RE and mixtures thereof.

26 Claims, 2 Drawing Sheets

BIODEGRADABLE LINEAR RANDOM COPOLYESTER AND PROCESS FOR PREPARING IT AND USE OF THE SAME

This application claims priority under 35 U.S.C. §119 of Chinese Application Nos. 200410101545.8, 200410101547.7 and 200410103527.3, filed respectively on Dec. 23, 2004, Dec. 23, 2004 and Dec. 30, 2004.

BACKGROUND OF THE INVENTION

1. Field of the Invention

The present invention relates to a biodegradable linear random aliphatic/aromatic copolyester, in particular, to a biodegradable aliphatic/aromatic copolyester of high molecular weight and narrow molecular weight distribution, and to a process of making and use of the same.

2. Description of the Related Art

At present, aromatic polyesters such as polyethylene terephthalate (PET), polybutylene terephthalate (PBT), polypropylene terephthalate (PPT) as engineering materials have been widely applied in various fields. These polymers can be made into various materials such as fibers, beverage bottles and films. However, these polymers are not substantially biodegradable, and are very resistant to bacterial or fungal attack. Until now, no bacteria or enzyme has been observed to be able to erode pure aromatic polyesters (PET, PBT). These polyesters are also difficult to degrade in water. The service life of PET can be up to 16-48 years, and PET fiber can exist in a human/animal body for 30 years. Thus, the "white pollution" that results from these polymers is an impending disaster facing humanity, and there is an urgent need to develop biodegradable materials. Aliphatic polyesters are attracting more and more attention owing to their excellent biocompatibility and biodegradability, their non-toxicity, their degradation products, etc. They have been applied to biomedical materials (skeleton fixing and supporting materials, drug controlled-release materials, nerve guide and artificial blood vessel, suture line, etc.) and environment-friendly materials (trash bag, shopping bag, food packaging, dishware, agricultural mulch film, domestic bottles and jars, fishing gears, etc.). However, compared with aromatic polyesters, the use of aliphatic polyesters has been limited due to defects such as low melting point, weak mechanical property and their high price. Therefore, the development of aliphatic-aromatic copolyesters, which combine the excellent use and processing properties of aromatic polyesters with the excellent biodegradability of aliphatic polyesters, is an important area of research regarding degradable materials.

In recent years, aliphatic/aromatic copolyesters have been commercialized abroad, mainly including Ecoflex from BASF AG, Germany; Eastar Bio from Eastman Co., USA; Bionelle from Showa Co., USA (whose resins are provided by Showa Highpolymer Co., Japan, and SK Chemicals Co., Korea), Sky Green BDP from SK Chemicals; Biomax from Dupont Co., etc.

Since these copolyesters are prepared via polycondensation, in which distilled fractions come out, it is difficult to prepare a high-molecular weight product, and in general only a product having a molecular weight of tens of thousands can be prepared. Owing to the low molecular weight, the mechanical properties of the product do not meet current standards for non-degradable materials that are widely used at present. Thus, it has become more important to prepare a high-molecular weight copolyester product having sufficient mechanical and processing properties. In U.S. Pat. Nos. 5,817,721, 5,889,135, 6,018,004, 6,046,248 and 6,114,042, BASF AG set forth that the addition of an anhydride, ether or isocyanate having multiple (at least three) functional groups reactive with polyester as a chain extender can increase the weight-average molecular weight (maybe up to hundreds of thousands) of the obtained copolyester, but the number-average molecular weight is not increased to such an extent as the weight-average molecular weight, and the molecular weight distribution of the product becomes substantially broader (3.5-8). The obtained product has a long-chain branch structure, which inhibits further processing. Moreover, the added chain extender is directly linked to the long chain of the polymer, which makes the polymer's structure complicated and impure, and the material is also hard to remove.

The preparation of polyesters prepared by polycondensation, such as polyethylene terephthalate (PET), polybutylene terephthalate (PBT) and polypropylene terephthalate (PPT), involves two steps comprising: esterification or interesterification of terephthalic acid or ester-forming derivatives thereof with aliphatic diol, wherein the esterification is carried out at high pressure, and the interesterification is carried out at atmospheric pressure; and vacuum polycondensation of the esterified or interesterified product. The two steps are generally carried out separately, and two polymerization autoclaves are needed therefor.

The catalyst systems used in the preparation of polyesters by polycondensation are diversified, involving almost all subgroup A and B elements in the Periodic Table of the Elements except for halogens and the inert elements. Those having the best catalytic effect may be generalized into the following three types: Ti-series, Sb-series and Ge-series. Ti-series elements as catalysts have high catalytic activity, but the polyester product obtained has poor stability and yellow color. When Sb-series elements are used as catalysts, the polymerization reaction goes steadily. At present, 80% of polyester products are prepared using Sb-series catalyst at home and abroad. However, since Sb elements are not environmentally friendly owing to their toxicity, the service field of polyester products prepared thereby is limited. Ge-series catalysts are one type of polyester catalysts having the best overall effects, but they cannot be widely used due to their high price.

In U.S. Pat. No. 5,817,721, BASF AG discloses a biodegradable polyester, which is obtained by mixing batch-wise aromatic dicarboxylic acid or ester-forming derivatives, aliphatic diol, and aliphatic dicarboxylic acid or ester-forming derivatives, and allowing the mixture to react in the presence of Sn compounds, Ti compounds and the like as esterification, interesterification and polycondensation catalysts.

As disclosed in U.S. Pat. No. 6,018,004, U.S. Pat. No. 6,046,248 and U.S. Pat. No. 6,114,042, the preparation processes of polyesters in BASF AG are mostly carried out by two-steps in two polymerization autoclaves. First, adipic acid is esterified with 1,4-butanediol (BDO) in the presence of tin dioctoate as a catalyst thereby obtaining an esterified product. Then, the esterified product as above obtained, dimethyl terephthalate (DMT), BDO, and tetrabutyl orthotitanate (TBOT) are simultaneously added to another reactor, and after finishing the interesterification between DMT and BDO, the system undergoes polycondensation in vacuum. The molecular weight of the polyester product obtained is not high, the number-average molecular weight (Mn) being about $1 \times 10^4$, and the weight-average molecular weight being about $3 \times 10^4$. If an anhydride, ether or isocyanate having multiple (at least three) functional groups reactive with polyester is added as a chain extender to the aforesaid second step, the weight-average molecular weight of the obtained copolyester can be obviously increased, but the number-average molecular weight is not increased to the same extent as the weight-average molecular weight, and the molecular weight distribution of the product becomes broader (3.5-8).

Currently, the preparation of polyester by polycondensation generally includes three reaction stages, i.e., esterification, interesterification and polycondensation. In general, monomers and esterification or interesterification catalysts are simultaneously added to a polymerization autoclave; after finishing esterification or interesterification (which is determined upon the distilled fractions), the esterified or interesterified product and polycondensation catalyst are simultaneously added to another polymerization autoclave for polycondensation in vacuum.

The preparation of polyester by polycondensation is a relatively mature process. Currently, the compounds of Ti, Zn, etc., and the compounds of heavy metals such as Pb, Sn, Sb and Cd are generally used as catalysts at the stages of esterification, interesterification and polycondensation. The former compounds produce serious side reactions, and the polyester product obtained has poor stability and yellow color; and the latter compounds have some toxicity, thus the use of the polyester products obtained is limited. Although germanium oxide catalyst systems have relatively better effects, it is difficult to widely use them owing to their high price. Thus, it is highly desirable in the polyester industry to develop a novel catalyst system having good effects and low price.

In recent years, the use of rare earth (RE) compounds as catalysts has attracted the interest of scholars at home and abroad. There are many relevant techniques with respect to the preparation of polyesters using La-series metal catalysts, e.g., CN1,112,573A, EP0,626,425 and CN1,446,837A. In patent application No. CN1,112,573A, Enichemu Co., Italy, discloses the use of La-series metal compounds, their metal salts, metal composite salts or salt-containing complexes as catalysts, thereby obtaining a thermoplastic aromatic polyester having high resistance to degradation in the molten state. In European patent application EP0,626,425, La-series metal composite salts are used as catalysts for producing a thermoplastic aryl polycarbonate/aryl polyester component, with the thermoplastic component obtained having improved mechanical, thermal and electrical performance and relatively high stability. In Chinese patent application CN1,446,837A, a La-series metal catalyst for preparing polyester is disclosed, said catalyst including components R1 and R2, wherein R1 is La-series metal halide and/or a La-series metal complex, and R2 is La-series metal hydroxide, and the mixture of both can enable the interesterification to be carried out rapidly and stably.

China is enriched with RE elements, accounting for about 80% of world reserves. Although it is well known that the use of RE compounds as polyester catalysts can increase the rate of polymerization, the actual process and the selection of catalysts need to be further studied. In the technique of polyester preparation, there still exist many shortcomings such as complicated operation processes and relatively broad molecular weight distribution of the polymerized product. Thus, it is desirable to provide a process for preparing polyesters using novel RE catalyst systems that are capable of simplifying the present polyester preparation process and reducing the occurrence of side reactions.

At present, all polymerization catalyst systems used for preparing biodegradable aliphatic/aromatic copolyesters by polycondensation in the prior art are titanium alkoxide, alkyl tin, germanium oxide and etc., for example, tetrabutyl orthotitanate, titanium isopropoxide and etc. as disclosed in 《Nihon Yukagakkaishi》 (1999, 48(9), p 911-915), European patent EP1,106,640A2, and Germany patent DE19,923,053A1, n-butyl tin as disclosed in Korea patent KR9,709,332B1, germanium compounds as disclosed in Japanese patent JP2,004,018,674A2, and so on. As described above, the catalyst systems commonly used for polyesters still have various defects which result in product of yellow color, and produce serious side reactions.

To sum up, the existing catalysts for polyesters have many shortcomings including low polymerization rate, serious side reactions, toxicity, product of yellow color, etc. Additional shortcomings such as complicated processes and relatively broad molecular weight distribution of the polymerized product further exist in the known techniques for preparing biodegradable copolyesters.

SUMMARY OF THE INVENTION

The object of the present invention is to obtain biodegradable copolyesters of high molecular weight and narrow molecular weight distribution.

Another object of the present invention is to provide a process for preparing polyester in the presence of a RE compound catalyst component.

BRIEF DESCRIPTION OF THE DRAWING FIGURES

In the four peaks of abcd (a: 4.41 ppm, b: 4.35 ppm, c: 4.12 ppm, d: 4.06 ppm), a and d respectively correspond to homopolymerized chain segments, b and c respectively correspond to copolymerized chain segments. The molar ratio of the two monomers in the polymer is 50:50, and the chain segments where the two monomers directly link with each other account for 50% of the total polymer chain segments, which illustrates that the copolyester is a statistically random copolymer.

DETAILED DESCRIPTION

The term "biodegradable" as used herein refers to the fact that, under the action of microorganisms, organic compounds are decomposed into carbon dioxide ($CO_2$), water ($H_2O$) as well as mineralized inorganic salt(s) of element(s) contained therein and new biomass.

The biodegradable aliphatic/aromatic copolyester described herein is a random and linear aliphatic/aromatic copolyester, which comprises the following structural unit:

wherein m is an integer of 2 to 10, n is an integer of 0 to 8, p is an integer of 2 to 10, m, n and p being the same or different, x is an integer of 1 to 10, and y is an integer of 1 to 10. Preferably, m is an integer of 2 to 4; n is an integer of 2 to 4; p is an integer of 2 to 4; x is an integer of 1 to 3; and/or y is an integer of 1 to 2. As determined by GPC, its weight-average molecular weight $M_w$ is 100,000-600,000 g/mol, preferably 100,000-300,000 g/mol; and its molecular weight distribution is 1.2-3, preferably 1.5-2.5.

The aliphatic/aromatic copolyester described herein has a melting temperature range of preferably 20 to 185° C., and a glass transition temperature of preferably −55 to −7° C.

The biodegradable copolyester described herein can be used for preparing profiles, films, fibers or coatings. The biodegradable copolyester having high molecular weight can be prepared herein by adding a RE compound as catalyst as well as controlling the feed ratio of monomers/catalyst and the relevant process parameters in the absence of any chain extender. The product obtained has a molecular weight distribution of less than 3, and has a linear structure. The compositional structure of the copolymer can be strictly controlled via adjusting the feed ratio, so that a statistically random copolymer can be prepared.

The present invention further relates to a process for preparing polyester, which comprises the steps of:

1) adding the following monomers and an optional catalyst component Cat1 to a reactor to carry out interesterification and/or esterification: (a) aromatic dicarboxylic acid, ester thereof, anhydride thereof, or mixture thereof, (b) aliphatic diol, alicyclic diol or mixture thereof, and (c) aliphatic dicarboxylic acid, alicyclic dicarboxylic acid, ester thereof, anhydrides thereof, or mixture thereof;

wherein the molar ratio of the monomer (a) to monomer (c) is 0:100-100:0;

2) prepolymerizing the reaction system obtained in step 1) under vacuum; and 3) adding a catalyst component Cat2 to the prepolymerized product obtained in step 2) to carry out polycondensation under vacuum, thereby obtaining the desired polyester;

wherein, the catalyst component Cat1 is selected from the group consisting of the compounds of metals Ti, Sb and Zn, and mixtures thereof;

the catalyst component Cat2 is selected from the group consisting of the compounds of RE metal Ln and mixtures thereof, said RE metal Ln being selected from the group consisting of La-series elements, Sc and Y and combinations thereof.

When an aliphatic/aromatic copolyester is prepared, in the step 1), the aromatic monomer (a) may first react with the diol monomer (b), followed by adding the aliphatic monomer (c); or the aliphatic monomer (c) may first react with the diol monomer (b) followed by adding the aromatic monomer (a). Preferably, in the step 1), the catalyst component Cat1, and the monomers (a) and (b) first react by adding them to a reactor, followed by reacting with the monomer (c) to be added. The latter is more favorable for interesterification and esterification.

In one embodiment described herein, the monomers (a) and (b) along with Cat1 are first added to a reactor, and undergo esterification or interesterification at a temperature of preferably 150-230° C. When the distilled fraction as collected attains above 90% of its theoretical amount, the monomer (c) was added to the system, which thereafter undergoes the second-step esterification or interesterification at a temperature of preferably 160-250° C. Then, the system enters into the next step of prepolymerization when the distilled fraction as collected again attains above 90% of its theoretical amount.

The above two steps of esterification or interesterification may be carried out under atmospheric pressure, vacuum or superatmospheric pressure condition, preferably under atmospheric pressure.

Preferably, the prepolymerization of the step 2) is carried out at a temperature of 190-250° C. and a vacuum pressure of 200-600 Pa, preferably 200-300 Pa for 1-3 h, preferably 1-2 h; or the step 3) is started after the small molecules (including the unreacted monomers) in the reaction system of step 2) are almost completely evacuated and the temperature of the fraction is kept constant. In step 3), catalyst component Cat2 is added to the reaction system.

In the step 3), the polycondensation is carried out at a temperature of preferably 200-300° C., more preferably 220-280° C., and a vacuum pressure of preferably ≦300 Pa, more preferably ≦200 Pa, for preferably 3-8 h.

All pressures mentioned herein are gauge pressures.

A single-autoclave operation may be adopted in the process for preparing polyester described herein, i.e., the steps 1), 2) and 3) are carried out in the same autoclave.

In one preferred embodiment of the process described herein, the molar ratio of the monomer (a)/monomer (c) is 0:100-65:35, preferably 35:65-60:40; the molar ratio of the monomers (a)+(c)/monomer (b) is 1:(1.0-3.0), preferably 1:(1.0-2.0), more preferably 1:(1.1-1.5), even more preferably 1:(1.2-1.4); and the molar ratio of the catalyst system/ the monomers (a)+(c) is 1:(500-10,000), preferably 1:(1, 000-3,000).

In one preferred embodiment of the process described herein, the monomer (a) is selected from the group consisting of p-phenylene dicarboxylic acid, ester thereof or anhydride thereof, preferably terephithalic acid or dimethyl terephthalate; the monomer (b) is selected from the group consisting of C2-C6 aliphatic diol, C5-C10 alicyclic diol and mixtures thereof, preferably 1,4-butanediol, 1,3-propanediol or ethylene glycol; and the monomer (c) is selected from the group consisting of C3-C10 aliphatic dicarboxylic acid, C5-C10 alicyclic dicarboxylic acid, ester thereof, anhydrides thereof and mixtures thereof, preferably adipic acid, sebacic acid or succinic acid.

In one preferred embodiment of the process described herein, the monomer (a) is selected from the group consisting of terephthalic acid, ester thereof, anhydride thereof or mixtures thereof; the monomer (b) is selected from the group consisting of C2-C6 aliphatic diol, C5-C10 alicyclic diol or mixtures thereof; and the monomer (c) is selected from the group consisting of adipic acid, ester thereof, anhydride thereof or mixtures thereof. In which, the molar ratio of the monomer (a)/monomer (c) is (5-75):(25-95), and the molar ratio of the monomers (a)+(c)/monomer (b) is 1:1-1:2. Preferably, in which, the molar ratio of the monomer (a)/(c) is (25-65):(35-75), and the molar ratio of the monomers (a)+(c)/monomer (b) is 1:1.2-1:1.5.

In one preferred embodiment of the process described herein, the catalyst component Cat 1 is selected from the group consisting of M(OR2')x, M2Ox, M(R1'COO)x and mixtures thereof, preferably selected from the group consisting of titanium alkoxide Ti(OR2')x, antimony acetate, zinc acetate, zinc oxides, antimony oxides, titanium oxides, mixtures thereof, more preferably selected from the group consisting of tetrabutyl orthotitanate, i titanium isoproxide, titanium dioxide, antimony trioxide, antimony acetate, zinc acetate and mixtures thereof; and the catalyst component Cat2 is selected from the group consisting of RE-metal's inorganic halides LnX3, carboxylates Ln(R1COO)3, alkoxides Ln(OR2)3, aryloxides Ln(OAr)3, acetylacetonates Ln(acac)3, hydrates thereof and mixtures thereof, preferably selected from the group consisting of RE-metal's inorganic halides LnX3, alkoxides Ln(OR2)3, aryloxides Ln(OAr)3, acetylacetonates Ln(acac)3 excluding samarium acetylacetonate Sm(acac)3, and mixtures thereof;

Preferably, the molar ratio of Cat2/Cat1 is 5:95-100:0, more preferably 1:3-3:1, even more preferably 2:3-3:2;

In which, the RE metal Ln is preferably selected from the group consisting of La, Ce, Pr, Nd, Td, Yb, Dy, Sm, Sc and combinations thereof, more preferably selected from the group consisting of La, Ce, Pr, Nd, Sc and combinations thereof;

X is a halogen ion, preferably chlorine ion or bromine ion, and acac is an acetylacetone group;

R1 and R1' are selected from C1-C3 alkyl, R1, R1' being same or different;

R2 and R2' are selected from C3-C6 alkyl, R2, R2' being same or different, preferably, R2 is isopropyl, n-butyl or isopentyl;

Ar is selected from C1-C4 alkyl substituted phenyl, preferably 2,6-di-tert-butyl-4-methylphenyl or 4-butylphenyl;

M is metal Ti, Sb or Zn, and x is 2, 3 or 4.

In one preferred embodiment of the process described herein, the catalyst component Cat1 is selected from the group consisting of tetrabutyl orthotitanate, titanium isopropoxide, titanium dioxide, antimony trioxide, antimony acetate, zinc acetate and mixtures thereof, and the catalyst component Cat2 is selected from the group consisting of RE inorganic halides $LnX_3$, carboxylates $Ln(R1COO)_3$, alkoxides $Ln(OR2)_3$, arylloxides $Ln(OAr)_3$, and mixtures thereof, and the molar ratio of Cat2/Cat1 is 2:3-3:2;

in which, the RE metal Ln is selected from the group consisting of La, Ce, Pr, Nd, Sc and combinations thereof, and X is chlorine ion or bromine ion;

R1 is ethyl or propyl, and R2 is isopropyl, n-butyl or isopentyl;

Ar is 2,6-di-tert-butyl-4-methylphenyl or 4-butylphenyl.

The catalyst used herein is a single-component catalytic system of non-toxic or low-toxic RE compounds, or a multiple-component composite catalytic system of RE compounds and other metal compounds, which is favorably used for preparing biodegradable aliphatic/aromatic homo- and co-polyesters. The catalyst system may thus be a single-component Cat2, or a multiple-component composite system of Cat2 and Cat1.

The RE compounds as the catalyst component Cat2 of the catalyst system described herein may be prepared by the methods of synthesizing or treating RE compounds as disclosed in the prior art, e.g., the methods disclosed in the documents «J. Inorg. Nuel. Chem.» (1962, 34, p 387), «Polymer» (2001, 42, p 7511), «Inorganic Chemistry» (1970, 9, p 2505), and «J. Chem. Soc., Chem. Commun.» (1983, p 1499), as mentioned in the following Examples.

The compounds of Ti, Sb and Zn as the catalyst component Cat1 of the catalyst system described herein may be commercial products, as mentioned in the following Examples.

Unless identified otherwise, the percentages and ratios used herein are all on the basis of weight.

All the publications mentioned are incorporated herein for reference in their entirety for all purposes.

The biodegradable copolyester described herein has the following features:

1) as being prepared in the absence of additives such as chain extender and stabilizer, the copolyester product is pure;

2) both the number-average and weight-average molecular weights of the copolyester product are significantly increased, with a molecular weight distribution being less than 3;

3) the compositional ratio of the copolyester product can be strictly controlled by adjusting the feed ratio of monomers, the compositional ratio of the copolymer is substantially equal to the feed ratio of monomers;

4) the copolyester product is in a long chain random linear structure, which is in favor of degradation and combination of excellent properties of two homopolymers; and 5) the copolyester product has mechanical properties up to or exceeding those of LDPE product, a relatively broader use temperature range (with better performance than those of the product having the same components disclosed in U.S. Pat. No. 5,889,135 to BASF AG), and excellent processability.

The present process for preparing copolyester described herein has the following features:

1) the operation process is simplified by using a single-autoclave operation; the side reactions are reduced, and the polyester product's color is significantly improved;

2) the catalyst system used herein is a high-efficiency, non-toxic or low-toxic catalyst system, which can significantly increase the polymerization rate with the polycondensation time being reduced from 10 h to 3-8 h in comparison with the single-component titanium compound catalyst system; at the same time as increasing the weight-average molecular weight, the number-average molecular weight of the polyester product is also increased, with its molecular weight distribution not being broadened; meanwhile, the reaction course is steady, and easily controlled;

3) the molecular weight of the polymerized product can be significantly increased in the absence of a chain extender; thus, the polyester product is pure, and free of additives such as chain extender and stabilizer; and 4) the process described herein is particularly suitable for preparing polyester having an aliphatic/aromatic molar ratio of 35-100:65-0, and the polyester product obtained thereby can be completely biodegraded within eight months.

MODE OF CARRYING OUT THE INVENTION

The raw materials used in Examples of the present invention are as follows:

DMT: dimethyl terephthalate, CP degree, Beijing Xingjin Chemical Plant, China

ADP: adipic acid, AP degree, Shanghai Chemical Reagent Co., China Medical Group

BD: butanediol, AP degree, Beijing Yili Fine Chemicals Co., Ltd, China.

SCN: succinic acid, AP degree, Sanyi Chemicals Co., Ltd, Shenzhen city, China.

Acetic acid: 50%, Beijing Chemical Reagent Co., China

Stearic acid: AP degree, Beijing Chemical Reagent Co., China

Tetrabutyl orthotitanate: CP degree, Beijing Chemical Reagent Co., China

Zinc acetate: AP degree, Beijing Chemical Reagent Co., China

RE oxides: a purity of 99.5%, Beijing Xinhua Reagent Factory, China

RE chloride hydrates: CP degree, Beijing Xinhua Reagent Factory, China 2,6-di-tert-butyl-4-methylphenol: CP degree, Shanghai Chemical Reagent Co., China Medical Group Isopropanol: AP degree, Beijing Chemical Plant, China Sodium: Beijing Jinlong Chemical Reagent Co., Ltd., China The methods for determining relevant data in examples of the present invention are as follows.

The compositional components of the polymer are determined by nuclear magnetic resonance (NMR) using Bruker Avance DMX500 model superconductive NMR spectrometer (1H NMR: 500 MHz) at 25° C., with CDCl3 as solvent, and TMS as internal standard.

The molecular weight and molecular weight distribution of the polymer are determined by gel permeation chromatograph (GPC) using Waters-208 instrument (Waters 2410 RI detector, a flow rate of 1.5 ml/min, and a temperature of 30° C.), with THF as solvent, and the molecular weight calibrated by styrene standard sample.

The viscosity number (VN) is determined in a 0.005 g/ml polymer solution of o-dichlorobenzene/phenol in a weight ratio of 50/50 at 25° C., according to the test standard GB/T 17932-1999.

The yellow index is determined by using TC-PIIG full-automatic colorimeter according to the method described in GB 2409-1989.

The glass temperature (Tg) and melting temperature (Tm) of the polymer are determined by differential scanning calorimetry (DSC) using Perkin Elmer Pyris 1 analyzer, each sample being heated from −100° C. to 250° C., and undergoing heating and scanning twice, with the heating rate of 20° C./min.

The tensile property of the polymer is determined according to the method described in ASTM D638-03.

The biodegrading characteristics of the polyester are tested by embedding-in-compost process. Polyester sample is hot pressed to form a film (10-20 μm), which is then cut into sample pieces of 2 cm×2 cm, the sample pieces so obtained are embedded in a culture dish packed with compost soil, and then the culture dish is put into an incubator under constant temperature and humidity. The humidity is kept at about 50%, and the temperature is kept at 58±2° C. The weight losses of the sample pieces are determined periodically.

EXAMPLES

The following examples further demonstrate the preferred embodiments of the present invention. All the examples are merely illustrative, and are not intended as limiting to the present invention.

Unless identified otherwise, each step involved in the preparation of the catalysts or polyester are all conducted under atmospheric pressure or ambient temperature.

Examples A1-6 Preparation of RE Catalyst Component Cat2

Example A1 Preparation of Anhydrous Lanthanum Chloride (LaCl3) (cf J. Inorg. Nucl. Chem., 1962, 34, 387)

10 g La2O3 was dissolved with excess amount of HCl. The obtained solution was concentrated by heating (temperature ≧100° C.) prior to adding metered NH4Cl (the molar ratio of NH4Cl/La2O3 was 3/1) to it. The excess acid was evaporated by carefully heating (temperature ≧100° C.), thereby obtaining a solid of LaCl3.nH2O+NH4Cl. The solid was milled before being added to a quartz sublimation tube, and then the tube was vacuum supplied till a pressure of less than 5 mmHg. The tube was slowly heated to 400° C. in a tubular furnace, with the vacuum pressure held for 1 h. The sublimation tube was cooled down to room temperature under vacuum, argon was filled to the sublimation tube before taking off the sublimation tube, and then under the protection of argon the solid in the sublimation tube was shifted to another sealed tube ready for use.

Example A2 Preparation of Lanthanum Acetylacetonate La(acac)3 (cf. Polymer, 2001, 42, 7511-7516)

In a 250 ml three-neck flask, LaCl3.7H2O (3.47 g, 9.37 mmol) was dissolved with 50 ml water to obtain a solution s1, said solution s1 being dropwise fed to a 50 ml aqueous solution s2 of acetylacetone (5.63 g, 56.2 mmol). The solution as mixed was stirred at room temperature, and 2 N KOH was added to it until the solution had a pH of 7. The reaction mixture containing a precipitate of La(acac)3 was stirred and filtered. Then, about 4 g of La(acac)$_3$ was obtained after drying in vacuum at 60° C.

Example A3 Preparation of RE Isopropoxide (cf. Inorg. Chem., 1970, 9(1), 2505-2510)

In a 250 ml three-neck flask, 0.02 mol anhydrous RE chloride was dissolved with 80 mol isopropanol by refluxing under heating. The obtained solution was cooled down to room temperature, to which a solution of sodium isopropoxide (obtained by dissolving 1.349 g sodium with a mixture of 20 ml isopropanol and 65 ml benzene) was dropped with rapid stirring. After finishing the dropping, the solution was refluxed by heating for 4 h, and then cooled down followed by standing overnight. The resulting solution was filtered with G4 sand-core filter bulb, the obtained filtrate was distilled to remove solvent, and then about 15 g of RE isopropoxide powder was obtained after drying under vacuum.

Example A4 Preparation of RE tri(2,6-di-tert-butyl-4-methylphenolate) (cf. Inorg. Chim. Acta, 1987, 139, 183-184)

0.5-0.8 g of anhydrous LnCl3 was exactly weighed and added to a polymerization ampoule under the protection of argon. According to the molar weight of LnCl3, the amount of 2,6-di-tert-butyl-4-methylphenol needed was calculated based on a molar ratio of 1:3.

An exact amount of 2,6-di-tert-butyl-4-methylphenol was added to a flask having a branch tube (through the branch tube argon is charged) under the protection of argon, to which 30 ml THF solvent was injected with stirring to obtain a solution. After adding excess sodium, the solution reacted at room temperature for 2-3 h until no bubble produced on the surface of the sodium. A little sodium was continuously added to judge whether the reaction had been completed, thereby obtaining a THF solution of sodium 2,6-di-tert-butyl-4-methylphenolate.

The anhydrous LnCl3 weighed was shifted to a 50 ml single-neck reaction bottle followed by the THF solution of sodium 2,6-di-tert-butyl-4-methylphenolate, to which argon was thoroughly filled. The system reacted in an oil bath of 80-90° C. by magnetic stirring for 2-3 days. The reaction product obtained is centrifugally filtered, and the filtrate is distilled under vacuum to remove solvent. Then, the desired RE tri(2,6-di-tert-butyl-4-methylphenolate) catalyst was obtained after drying for 1 h under vacuum.

Example A5 Preparation of RE Stearate

A calculated amount of Ln2O3 was weighed with a beaker, to which a suitable amount of distilled water was added followed by excess amount of HCl, and then the system was heated to dissolve thereby obtaining a transparent solution s3. Excess stearic acid was weighed with another beaker, to which a suitable amount of anhydrous ethanol was added to obtain a transparent solution s4 when heated. The solutions s4 and s3 were added in sequence to a 100 ml round flask, to which 10 mg of a phase transfer catalyst tetrabutylammonium bromide was charged followed by a magnetic stirrer. A condensation tube was connected above the flask under the protection of nitrogen atmosphere. The system was heated in an oil bath of less than 100° C. by magnetic stirring for about 5 h. The lower clear liquor was separated with a separatory funnel, and further evaporated to dryness.

Example A6 Preparation of RE Acetate (cf J. Inorg. Nucl. Chem., 1962, 24, 637-639)

10 g of a RE oxide was dissolved with 500 ml 50% acetic acid solution. After removing most of the solvent by distilling at 75° C., the RE salt obtained was heated to 75-150° C. (depending on different RE) under vacuum, and then dried till constant weight, thereby obtaining the corresponding RE acetate.

Comparative Example A1 Preparation of a Polyester with Single-Component Ti Catalyst 136 g (0.7 mol) dimethyl terephthalate, 126 g (1.4 mol) butanediol and 0.20 g (0.59 mmol) tetrabutyl orthotitanate were added to a 500 ml three-neck flask. Under the protection of nitrogen, the system was heated with stirring till refluxing. By controlling the reaction temperature at 160-220° C., methanol evaporated was collected. After finishing the collection of methanol, the system was vacuum supplied and heated, and then underwent polycondensation at a vacuum pressure of $\leq 200$ Pa and a temperature of 220-260° C. for 10 h. The obtained product had a yellow color and a viscosity number (VN) of 67 ml/g.

Comparative Example A2 Preparation of a Copolyester with a Single-Component Ti Catalyst 78 g (0.4 mol) dimethyl terephthalate, 86.5 g (0.96 mol) butanediol and 0.17 g (0.5 mmol) tetrabutyl orthotitanate were added to a 500 ml three-neck flask. Under the protection of nitrogen, the system was heated with stirring till refluxing. By controlling the reaction temperature at 160-220° C., methanol evaporated was collected. After finishing the collection of methanol, 58.5 g (0.4 mol) adipic acid was added to the system, and the system was continuously heated with stirring till refluxing. By controlling the reaction temperature at 180-240° C., water evaporated was collected. After finishing the collection of water, the system was vacuum supplied and heated, and then underwent polycondensation at a vacuum pressure of $\leq 200$ Pa and a temperature of 220-260° C. for 10 h. The obtained product was yellow, and had a number-average molecular weight Mn of 2.68×104, a weight-average molecular weight Mw of 5.29×104, and a molecular weight distribution of 1.97 (as determined by GPC).

Comparative Example A3

78 g (0.4 mol) dimethyl terephthalate, 86.5 g (0.96 mol) butanediol, 0.11 g (0.32 mmol) tetrabutyl orthotitanate and 0.073 g (0.17 mmol) lanthanum acetylacetonate were added to a 500 ml three-neck flask. Under the protection of nitrogen, the system was heated with stirring till refluxing. By controlling the reaction temperature at 160-220° C., methanol evaporated was collected. After finishing the collection of methanol, 58.5 g (0.4 mol) adipic acid was added to the system, and the system was continuously heated with stirring till refluxing. By controlling the reaction temperature at 180-240° C., water evaporated was collected. After finishing the collection of water, the system was vacuum supplied and heated, and then underwent polycondensation at a vacuum pressure of $\leq 200$ Pa and a temperature of 220-260° C. for 7 h. The obtained product was light yellow, and had a number-average molecular weight Mn of 3.08× 104, a weight-average molecular weight Mw of 6.21×104, and a molecular weight distribution of 2.02 (as determined by GPC).

Comparative Example A4

78 g (0.4 mol) dimethyl terephthalate, 86.5 g (0.96 mol) butanediol and 0.11 g (0.32 mmol) tetrabutyl orthotitanate were added to a 500 ml three-neck flask. Under the protection of nitrogen, the system was heated with stirring till refluxing. By controlling the reaction temperature at 160-220° C., methanol evaporated was collected. After finishing the collection of methanol, 58.5 g (0.4 mol) adipic acid was added to the system, and the system was continuously heated with stirring till refluxing. By controlling the reaction temperature at 180-240° C., water evaporated was collected, and then 0.073 g (0.17 mmol) lanthanum acetylacetonate was added to the system after finishing the collection of water. Afterward, the system was vacuum supplied and heated, and then underwent polycondensation at a vacuum pressure of $\leq 200$ Pa and a temperature of 220-260° C. for 7 h. The obtained product was white, and had a number-average molecular weight Mn of 3.84×104, a weight-average molecular weight Mw of 8.88×104, and a molecular weight distribution of 2.31 (as determined by GPC).

Example A7

136 g (0.7 mol) dimethyl terephthalate, 126 g (1.4 mol) butanediol and 0.10 g (0.29 mmol) tetrabutyl orthotitanate were added to a 500 ml three-neck flask. Under the protection of nitrogen, the system was heated with stirring till refluxing. By controlling the reaction temperature at 160-220° C., methanol evaporated was collected. After finishing the collection of methanol, the system was vacuum supplied, heated, and reacted at a vacuum pressure of 400 Pa and a temperature of 220-260° C. for about 1 h. Thereafter, 0.073 g (0.17 mmol) lanthanum acetylacetonate was added to the system, followed by allowing the system to polycondense at a vacuum pressure $\leq 200$ Pa and a temperature of 220-260° C. for 5 h. The obtained product had a white color and a viscosity number (VN) of 141 ml/g.

Example A8

78 g (0.4 mol) dimethyl terephthalate, 86.5 g (0.96 mol) butanediol and 0.11 g (0.32 mmol) tetrabutyl orthotitanate were added to a 500 ml three-neck flask. Under the protection of nitrogen, the system was heated with stirring till refluxing. By controlling the reaction temperature at 160-220° C., methanol evaporated was collected. After finishing the collection of methanol, 58.5 g (0.4 mol) adipic acid was added to the system, and the system was continuously heated with stirring till refluxing. By controlling the reaction temperature at 180-240° C., water evaporated was collected. After finishing the collection of water, the system was vacuum supplied, heated, and reacted at a vacuum pressure of 400 Pa and a temperature of 220-260° C. for about 1 h. Afterward, 0.073 g (0.17 mmol) lanthanum acetylacetonate was added to the system, followed by allowing the system to polycondense at a vacuum pressure $\leq 200$ Pa and a temperature of 220-260° C. for 6 h. The obtained product was white, and had a number-average molecular weight Mn of $4.53 \times 10^4$, a weight-average molecular weight Mw of $1.02 \times 10^5$, and a molecular weight distribution of 2.25 (as determined by GPC).

Example A9

The process conditions were the same as those in Example A8 except that 0.055 g (0.17 mmol) neodymium isopropoxide was used instead of lanthanum acetylacetonate.

Example A10

The process conditions were the same as those in Example A8 except that 0.14 g (0.17 mmol) lanthanum tri(2,6-di-tert-butyl-4-methylphenolate) was used instead of lanthanum acetylacetonate.

The parameters characterizing the copolyesters respectively obtained in Comparative Examples A1-A4 and in Examples A7-A10 are listed in Table A1 and Table A2.

TABLE A1

Influence of the addition of RE compound on the preparation of polyester

| No. | RE compound | Polycondensation time (h) | Viscosity number VN (ml/g) | Yellow index |
|---|---|---|---|---|
| Comparative Example A1 | Not added | 10 | 67 | 61.2 |
| Example A7 | Added | 5 | 141 | 41.5 |

TABLE A2

Influence of the addition manner of RE compound on the polymerization of copolyester

| No. | Addition manner of RE | Polycondensation time (h) | $M_n$ | $M_w$ | $M_w/M_n$ | Yellow index |
|---|---|---|---|---|---|---|
| Comparative Example A2 | Non-added | 10 | 2.68 | 5.29 | 1.97 | 75.5 |
| Comparative Example A3 | Added along with Cat1 | 7 | 3.08 | 6.21 | 2.02 | 58.1 |
| Comparative Example A4 | Added after interesterification and before polycondensation | 7 | 3.84 | 8.88 | 2.31 | 49.5 |
| Example A8 | Added after prepolymerization and before polycondensation | 6 | 4.53 | 10.2 | 2.25 | 47.9 |
| Example A9 | Added after prepolymerization and before polycondensation | 6 | 8.12 | 16.3 | 2.01 | 40.1 |
| Example A10 | Added after prepolymerization and before polycondensation | 6 | 7.76 | 15.3 | 1.97 | 41.2 |

Examples B6-B11

Examples of the preparation of copolyesters having an aliphatic/aromatic molar ratio of 1:1 (DMT/ADP being 1:1) are given. In the catalyst systems, Cat1 uses tetrabutyl orthotitanate or zinc acetate; and Cat2 uses different RE compounds.

78 g (0.4 mol) dimethyl terephthalate DMT, 86.5 g (0.96 mol) butanediol BD and a Cat1 component (which may not be added) were added to a 500 ml three-neck flask. Under the protection of nitrogen, the system was heated with stirring till refluxing. By controlling the reaction temperature at 160-220° C., methanol evaporated was collected. After finishing the collection of methanol, 58.5 g (0.4 mol) adipic acid ADP was added to the system, and the system was continuously heated with stirring till refluxing. By controlling the reaction temperature at 180-240° C., water evaporated was collected. After finishing the collection of water, the system was vacuum supplied, heated, and reacted at a vacuum pressure of 400 Pa and a temperature of 220-260° C. for about 1 h. Afterward, 0.17 mmol of a Cat2 component was added to the system, followed by allowing the system to polycondense at a vacuum pressure of $\leq 200$ Pa and a temperature of 220-260° C. for 7 h. The catalyst components Cat1 and Cat2 used as well as the performances of the copolyester products obtained are listed in Table B1.

TABLE B1

Performances of copolyesters prepared by different catalyst systems

| No. | Cat1/Cat2 | Yellow index | $M_n$ (×10$^4$) | $M_w$ (×10$^4$) | $M_w/M_n$ |
|---|---|---|---|---|---|
| Example B6 | 0.11 g tetrabutyl orthotitanate/ 0.073 g lanthanum acetylacetonate | 37.2 | 6.82 | 14.0 | 2.05 |
| Example B7 | 0.11 g tetrabutyl orthotitanate/ 0.063 g lanthanum chloride hydrate | 39.5 | 4.98 | 10.9 | 2.18 |
| Example B8 | 0.5 g zinc acetate/ 0.055 g neodymium isopropoxide | 3.8 | 46.1 | 57.6 | 1.25 |
| Example B9 | 0.5 g zinc acetate/ 0.13 g neodymium tri(2,6-di-tert-butyl-4-methylphenolate) | 5.4 | 30.8 | 55.7 | 1.81 |

TABLE B1-continued

Performances of copolyesters prepared by different catalyst systems

| No. | Cat1/Cat2 | Yellow index | $M_n$ (x10$^4$) | $M_w$ (x10$^4$) | $M_w/M_n$ |
|---|---|---|---|---|---|
| Example B10 | 0/scandium stearate | 11.7 | 8.24 | 13.4 | 1.63 |
| Example B11 | 0/yttrium acetate | 6.5 | 5.95 | 11.8 | 1.99 |

Example B12

78 g (0.4 mol) dimethyl terephthalate DMT, 86.5 g (0.96 mol) butanediol BD and 0.11 g (0.32 mmol) tetrabutyl orthotitanate were added to a 500 ml three-neck flask. Under the protection of nitrogen, the system was heated with stirring till refluxing. By controlling the reaction temperature at 160-220° C., methanol evaporated was collected. After finishing the collection of methanol, 47.2 g (0.4 mol) succinic acid SCN was added to the system, and the system was continuously heated with stirring till refluxing. By controlling the reaction temperature at 180-240° C., water evaporated was collected. After finishing the collection of water, the system was vacuum supplied, heated and reacted at a vacuum pressure of 400 Pa and a temperature of 220-260° C. for 1 h. Afterward, 0.055 g (0.17 mmol) neodymium isopropoxide was added to the system, followed by allowing the system to polycondense at a vacuum pressure of ≦200 Pa and a temperature of 220-260° C. for 7 h. The obtained product was white, and had a number-average molecular weight Mn of 5.41×104, a weight-average molecular weight Mw of 1.11×105, and a molecular weight distribution of 2.05 (as determined by GPC).

Examples B13-B23

Homo- and co-polyesters having different aliphatic/aromatic molar ratios are prepared by using a catalyst system consisting of Cat2 lanthanum acetylacetonate and Cat1 tetrabutyl orthotitanate (1:1).

Example B13

136 g (0.7 mol) dimethyl terephthalate, 126 g (1.4 mol) butanediol and 0.10 g (0.3 mmol) tetrabutyl orthotitanate were added to a 500 ml three-neck flask. Under the protection of nitrogen, the system was heated with stirring till refluxing. By controlling the reaction temperature at 160-220° C., methanol evaporated was collected. After finishing the collection of methanol, the system was vacuum supplied, heated, and reacted at a vacuum pressure of 400 Pa and a temperature of 220-260° C. for about 1 h. Afterward, 0.13 g (0.3 mmol) lanthanum acetylacetonate was added to the system, followed by allowing the system to polycondense at a vacuum pressure of ≦200 Pa and a temperature of 220-260° C. for 4 h.

Example B14

155 g (0.8 mol) dimethyl terephthalate, 120 g (1.34 mol) butanediol and 0.13 g (0.37 mmol) tetrabutyl orthotitanate were added to a 500 ml three-neck flask. Under the protection of nitrogen, the system was heated with stirring till refluxing. By controlling the reaction temperature at 160-220° C., methanol evaporated was collected. After finishing the collection of methanol, 13.0 g (0.089 mmol) adipic acid was added to the system, and the system was continuously heated with stirring till refluxing. By controlling the reaction temperature at 180-240° C., water evaporated was collected. After finishing the collection of water, the system was vacuum supplied, heated, and reacted at a vacuum pressure of 400 Pa and a temperature of 220-260° C. for about 1 h. Afterward, 0.16 g (0.37 mmol) lanthanum acetylacetonate was added to the system, followed by allowing the system to polycondense at a vacuum pressure of ≦200 Pa and a temperature of 220-260° C. for 4 h.

Example B15

The process conditions were identical with those in Example B14 except that the amounts of the monomers and the catalyst components were changed as follows: 117 g (0.6 mol) dimethyl terephthalate, 86.5 g (0.96 mol) butanediol, 0.09 g (0.26 mmol) tetrabutyl orthotitanate, 29.0 (0.2 mol) adipic acid, and 0.116 g (0.26 mmol) lanthanum acetylacetonate.

Example B16

The process conditions were identical with those in Example B14 except that the amounts of the monomers and the catalyst components were changed as follows: 87.0 g (0.45 mol) dimethyl terephthalate, 108 g (1.2 mol) butanediol, 0.11 g (0.32 mmol) tetrabutyl orthotitanate, 44.0 (0.3 mol) adipic acid, and 0.14 g (0.32 mmol) lanthanum acetylacetonate.

Example B17

The process conditions were identical with those in Example B14 except that the amounts of the monomers and the catalyst components were changed as follows: 78 g (0.4 mol) dimethyl terephthalate, 86.5 g (0.96 mol) butanediol, 0.12 g (0.34 mmol) tetrabutyl orthotitanate, 58.5 (0.4 mol) adipic acid, and 0.15 g (0.34 mmol) lanthanum acetylacetonate.

Example B18

The process conditions were identical with those in Example B14 except that the amounts of the monomers and the catalyst components were changed as follows: 58.0 g (0.3 mol) dimethyl terephthalate, 81 g (0.9 mol) butanediol, 0.11 g (0.32 mmol) tetrabutyl orthotitanate, 66.0 (0.45 mol) adipic acid, and 0.14 g (0.32 mmol) lanthanum acetylacetonate.

Example B19

The process conditions were identical with those in Example B14 except that the amounts of the monomers and the catalyst components were changed as follows: 58.0 g (0.3 mol) dimethyl terephthalate, 108 g (1.2 mol) butanediol, 0.10 g (0.3 mmol) tetrabutyl orthotitanate, 88.0 (0.6 mol) adipic acid, and 0.13 g (0.3 mmol) lanthanum acetylacetonate.

Example B20

The process conditions were identical with those in Example B14 except that the amounts of the monomers and the catalyst components were changed as follows: 58.0 g (0.3 mol) dimethyl terephthalate, 122 g (1.35 mol) butanediol, 0.12 g (0.35 mmol) tetrabutyl orthotitanate, 110.0 (0.75 mol) adipic acid, and 0.15 g (0.35 mmol) lanthanum acetylacetonate.

Example B21

The process conditions were identical with those in Example B14 except that the amounts of the monomers and the catalyst components were changed as follows: 39.0 g (0.2 mol) dimethyl terephthalate, 108 g (1.2 mol) butanediol, 0.09 g (0.26 mmol) tetrabutyl orthotitanate, 88.0 (0.6 mol) adipic acid, and 0.12 g (0.26 mmol) lanthanum acetylacetonate.

Example B22

The process conditions were identical with those in Example B14 except that the amounts of the monomers and the catalyst components were changed as follows: 26.1 g (0.13 mol) dimethyl terephthalate, 108 g (1.2 mol) butanediol, 0.11 g (0.33 mmol) tetrabutyl orthotitanate, 132 (0.9 mol) adipic acid, and 0.15 g (0.33 mmol) lanthanum acetylacetonate.

Example B23

The process conditions were identical with those in Example B14 except that the amounts of the monomers and the catalyst components were changed as follows: 146 g (0.75 mol) dimethyl terephthalate, 108 g (1.2 mol) butanediol, 0.11 g (0.33 mmol) tetrabutyl orthotitanate, and 0.15 g (0.33 mmol) lanthanum acetylacetonate.

The copolyesters obtained in Examples B13-23 are analyzed, with the results being listed in Table B2.

Example C1

87.0 g (0.45 mol) dimethyl terephthalate, 108 g (1.2 mol) butanediol and 0.11 g (0.32 mmol) tetrabutyl orthotitanate were added to a 500 ml three-neck flask. Under the protection of nitrogen, the system was heated with stirring till refluxing. By controlling the reaction temperature at 160-220° C., methanol evaporated was collected. After finishing the collection methanol, 13.0 g (0.089 mmol) adipic acid was added to the system, and the system was continuously heated with stirring till refluxing. By controlling the reaction temperature at 180-240° C., water evaporated was collected. After finishing the collection of water, the system was vacuum supplied, heated, and reacted at a vacuum pressure of 400 Pa and a temperature of 220-260° C. for about 1 h. Afterward, 0.10 g (0.32 mmol) lanthanum isopropoxide was added to the system, followed by allowing the system to polycondense at a vacuum pressure of ≦200 Pa and a temperature of 220-260° C. for 7 h.

Example C2

The process conditions were identical with those in Example C1 except that the amounts of the monomers and the catalyst components were changed as follows: 78 g (0.4 mol) dimethyl terephthalate, 86.5 g (0.96 mol) butanediol, 0.12 g (0.34 mmol) tetrabutyl orthotitanate, 58.5 (0.4 mol) adipic acid, and 0.11 g (0.35 mmol) lanthanum isopropoxide.

TABLE B2

Preparation and performance parameters of copolyesters having different compositional ratios

| No. | Molar feed ratio of monomers (DMT/ADP) | Molar ratio of monomers to catalysts | Molar ratio of monomers acid/dibasic alcohol (DMT + ADP)/BD | Compositional molar ratio of polymer (DMT/ADP) | Molecular weight | | |
|---|---|---|---|---|---|---|---|
| | | | | | $M_n$ (x10$^4$) | $M_w$ (x10$^4$) | $M_w/M_n$ |
| Example B13 | 100/0 | 1170 | 1/2 | 100/0 | n.d.[c] | n.d. | n.d. |
| Example B14 | 90/10 | 1200 | 1/1.5 | 90/10 | n.d. | n.d. | n.d. |
| Example B15 | 75/25 | 1500 | 1/1.2 | 75/25 | n.d. | n.d. | n.d. |
| Example B16 | 60/40 | 1172 | 1/1.2 | 60/40 | n.d. | n.d. | n.d. |
| Example B17 | 50/50 | 1172 | 1/1.2 | 50/50 | 6.20 | 12.6 | 2.03 |
| Example B18 | 40/60 | 1172 | 1/1.2 | 40/60 | 6.15 | 11.6 | 1.88 |
| Example B19 | 33/67 | 1500 | 1/1.3 | 35/65 | 6.08 | 13.6 | 2.23 |
| Example B20 | 29/71 | 1500 | 1/1.3 | 30/70 | 6.21 | 13.2 | 2.12 |
| Example B21 | 25/75 | 1540 | 1/1.5 | 25/75 | 6.31 | 11.9 | 1.89 |
| Example B22 | 13/87 | 1560 | 1/1.2 | 13/87 | 6.50 | 13.4 | 2.06 |
| Example B23 | 0/100 | 1140 | 1/1.6 | 0/100 | 6.48 | 12.0 | 1.85 |

[c]n.d.: since the sample cannot be completely dissolved in THF solvent, its molecular weight and molecular weight distribution are not reported.

Example C3

The process conditions were identical with those in Example C1 except that the amounts of the monomers and the catalyst components were changed as follows: 58.0 g (0.3 mol) dimethyl terephthalate, 81 g (0.9 mol) butanediol, 0.11 g (0.32 mmol) tetrabutyl orthotitanate, 66.0 (0.45 mol) adipic acid, and 0.10 g (0.32 mmol) lanthanum isopropoxide.

Example C4

The process conditions were identical with those in Example C1 except that the amounts of the monomers and the catalyst components were changed as follows: 58.0 g (0.3 mol) dimethyl terephthalate, 108 g (1.2 mol) butanediol, 0.10 g (0.3 mmol) tetrabutyl orthotitanate, 88.0 (0.6 mol) adipic acid, and 0.09 g (0.3 mmol) lanthanum isopropoxide.

Example C5

The process conditions were identical with those in Example C1 except that the amounts of the monomers and the catalyst components were changed as follows: 58.0 g (0.3 mol) dimethyl terephthalate, 122 g (1.35 mol) butanediol, 0.12 g (0.35 mmol) tetrabutyl orthotitanate, 110.0 g (0.75 mol) adipic acid, and 0.11 g (0.35 mmol) lanthanum isopropoxide.

Example C6

The process conditions were identical with those in Example C1 except that the amounts of the monomers and the catalyst components were changed as follows: 39.0 g (0.2 mol) dimethyl terephthalate, 108 g (1.2 mol) butanediol, 0.09 g (0.26 mmol) tetrabutyl orthotitanate, 88.0 (0.6 mol) adipic acid, and 0.08 g (0.26 mmol) lanthanum isopropoxide.

The copolyesters obtained in Examples C1-C6 are analyzed, with the results being listed in Table C1.

Figure 1:
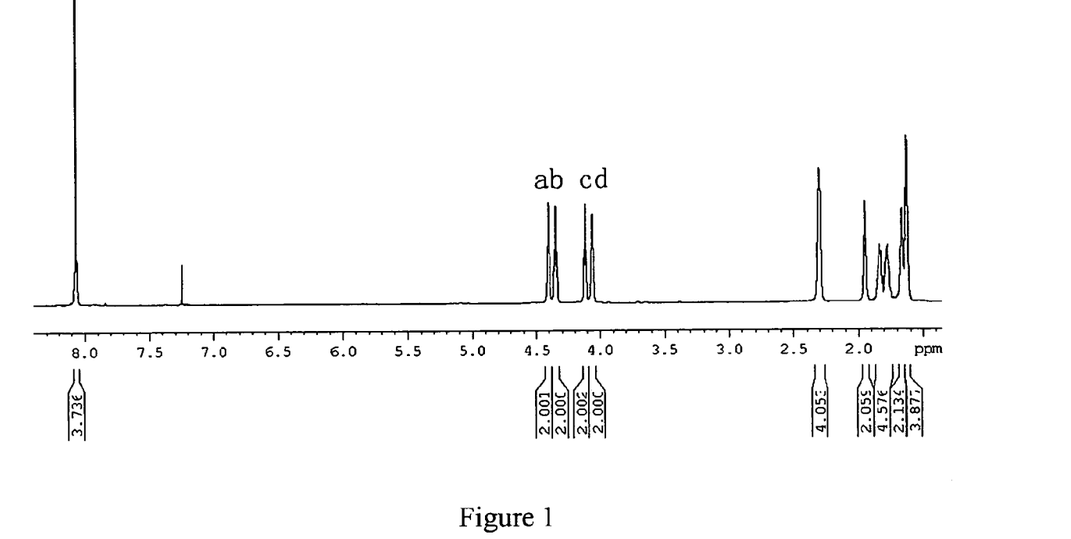
FIG. 1 is an 1H NMR spectrum of copolyester product of DMT/ADP=1/1 of the present invention.
Figure 2:
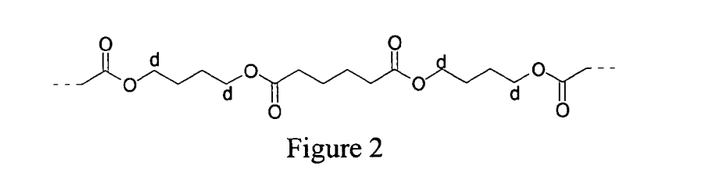
FIG. 2 is the structural formula of poly(butylene adipate).
Figure 3:
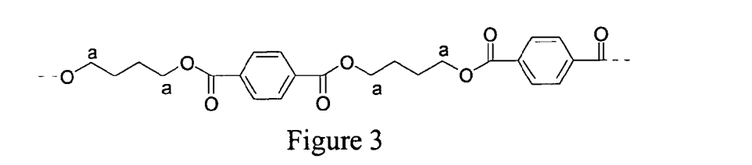
FIG. 3 is the structural formula of poly(butylene terephthalate).
Figure 4:
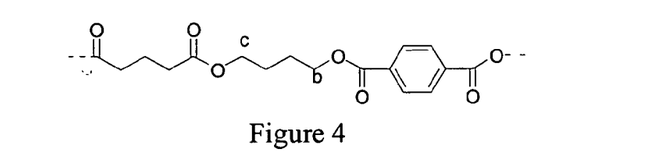
FIG. 4 is the structural formula of poly(butylene terephthalate-co-butylene adipate).
Figure 5:
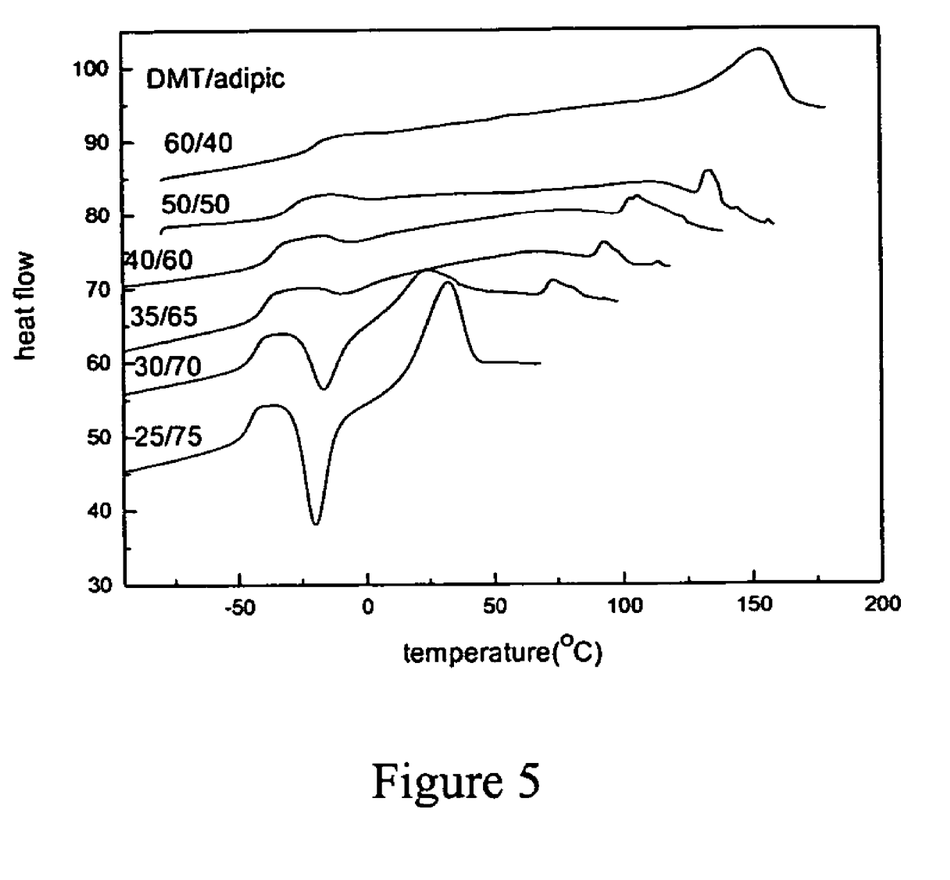
FIG. 5 is the DSC curve of the copolyester product of the present invention.

By characterizing the polymer's structure with $^1$H NMR, it is found that, taking Example C2 (DMT/ADP=1/1) as an example, as shown in FIG. 1 in combination with the single peak character in GPC and the sole melting peak in DSC, the copolyester is a typical random copolymer and conforms to statistical distribution law.

The invention claimed is:

1. A random linear aliphatic/aromatic copolyester, which comprises the following structural unit:

wherein m is an integer of 2 to 10, n is an integer of 0 to 8, p is an integer of 2 to 10, m, n and p being same or different, x is an integer of 1 to 10, and y is an integer of 1 to 10; and wherein the copolyester has a weight-average molecular weight $M_w$ of 100,000-600,000 g/mol, and a molecular weight distribution of 1.2-3, as determined by GPC.

2. The copolyester according to claim 1, wherein m is an integer of 2 to 4, n is an integer of 2 to 4, p is an integer of 2 to 4, x is an integer of 1 to 3, and/or y is an integer of 1 to 2.

3. The copolyester according to claim 1, which has a weight-average molecular weight $M_w$ of 100,000-300,000 g/mol, and a molecular weight distribution of 1.5-2.5.

4. The copolyester according to claim 1, which has a melting temperature range of 20 to 185° C.

5. The copolyester according to claim 1, which has a glass temperature of −55 to −7° C.

6. A profile, film, fiber or coating comprising the copolyester according to claim 1.

TABLE C1

Preparation and performance parameters of the copolyesters having different compositional ratios

| No. | Molar feed ratio of monomers (DMT/ADP) | Compositional molar ratio of polymer (BT/BA)[a] | $M_n$ (x10⁴) | $M_w$ (x10⁴) | $M_w/M_n$ | $T_g$ (° C.) | $T_m$ (° C.) | Tensile Strength (MPa) | Strain (%) | Time for complete degradation (day) |
|---|---|---|---|---|---|---|---|---|---|---|
| Example C1 | 60/40 | 60/40 | n.d.[b] | n.d. | n.d. | −18.5 | 154.2 | 33.2 | 688 | 240 |
| Example C2 | 50/50 | 50/50 | 7.18 | 15.6 | 2.17 | −28.3 | 129.5 | 28.7 | 874 | 120 |
| Example C3 | 40/60 | 40/60 | 6.73 | 15.0 | 2.23 | −37.0 | 106.7 | 23.8 | 940 | 30 |
| Example C4 | 33/67 | 35/65 | 7.31 | 17.7 | 2.42 | −40.1 | 40.8 | 13.6 | 972 | 25 |
| Example C5 | 29/71 | 30/70 | 6.72 | 16.2 | 2.41 | −47.1 | 20.3 | 10.6 | 1204 | 15 |
| Example C6 | 25/75 | 25/75 | 8.15 | 15.7 | 1.93 | −46.0 | 42.7 | 10.5 | 1100 | 15 |

[a]: BT is aromatic chain segment, and BA is aliphatic chain segment.
[b] n.d.: since the sample cannot be completely dissolved in THF solvent, its molecular weight and molecular weight distribution are not reported.
$T_g$ indicates glass transition temperature.
$T_m$ indicates melting temperature.

7. A process for synthesizing the copolyester of claim 1, comprising the steps of:
1) adding the following monomers and an optional catalyst component Cat1 to a reactor to carry out interesterification and/or esterification: (a) aromatic dicarboxylic acid, ester thereof, anhydride thereof, or mixture thereof, (b) aliphatic diol, alicyclic diol or mixture thereof, and (c) aliphatic dicarboxylic acid, alicyclic dicarboxylic acid, ester thereof, anhydrides thereof, or mixture thereof,
wherein the molar ratio of the monomer (a)/monomer (c) is 13:87 to 90:10;
2) prepolymerizing the reaction system obtained in step 1) under vacuum; and
3) adding a catalyst component Cat2 to the prepolymerized product obtained in step 2) to carry out polycondensation under vacuum, thereby obtaining the desired polyester;
wherein, the catalyst component Cat1 is selected from the group consisting of the compounds of Ti, Sb and Zn, and mixtures thereof;
the catalyst component Cat2 is selected from the group consisting of the compounds of RE Ln and mixtures thereof, said RE Ln being selected from the group consisting of La-series elements, Sc and Y and combinations thereof; and
wherein the copolyester is synthesized with the absence of chain extender.

8. The process according to claim 7, wherein a catalyst component Cat2 is added after the temperature of fraction is kept constant in the reaction system of step 2).

9. The process according to claim 7, wherein, in the step 1), the catalyst component Cat1, and the monomers (a) and (b) firstly react by adding them to a reactor, followed by reacting with the monomer (c) to be added.

10. The process according to claim 7, wherein the molar ratio of the monomer (a)/monomer (c) is 13:87 to 65:35; the molar ratio of the monomers (a)+(c)/monomer (b) is 1:(1.0-3.0); and the molar ratio of the catalyst system/the monomers (a)+(c) is 1:(500-10,000).

11. The process according to claim 10, wherein the molar ratio of the monomer (a)/monomer (c) is 35:65-60:40.

12. The process according to claim 10, wherein the molar ratio of the monomers (a)+(c)/monomer (b) is 1:(1.1-1.5), and the molar ratio of the catalyst system/the monomers (a)+(c) is 1:(1,000-3,000).

13. The process according to claim 12, wherein the molar ratio of the monomers (a)+(c)/monomer (b) is 1:(1.2-1.4).

14. The process according to claim 7, wherein the monomer (a) is selected from the group consisting of p-phenylene dicarboxylic acid, ester thereof, anhydride thereof, or mixtures thereof; the monomer (b) is selected from the group consisting of $C_2$-$C_6$ aliphatic diol, $C_5$-$C_{10}$ alicyclic diol or mixtures thereof; and the monomer (c) is selected from the group consisting of $C_3$-$C_{10}$ aliphatic dicarboxylic acid, $C_5$-$C_{10}$ alicyclic dicarboxylic acid, ester thereof, anhydrides thereof or mixtures thereof.

15. The process according to claim 14, wherein the monomer (a) is terephthalic acid or dimethyl terephthalate; the monomer (b) is 1,4-butanediol, 1,3-propanediol or ethylene glycol; and the monomer (c) is adipic acid, sebacic acid or succinic acid.

16. The process according to claim 7, wherein the monomer (a) is selected from the group consisting of terephthalic acid, ester thereof, anhydride thereof or mixtures thereof, the monomer (b) is selected from the group consisting of $C_2$-$C_6$ aliphatic diol, $C_5$-$C_{10}$ alicyclic diol or mixtures thereof; and the monomer (c) is selected from the group consisting of adipic acid, ester thereof, anhydride thereof or mixtures thereof.

17. The process according to claim 16, wherein the molar ratio of the monomer (a)/monomer (c) is (5-75):(25-95), and the molar ratio of the monomers (a)+(c)/monomer (b) is 1:1-1:2.

18. The process according to claim 17, wherein the molar ratio of the monomer (a)/monomer (c) is (25-65):(35-75), and the molar ratio of the monomers (a)+(c)/monomer (b) is 1:1.2-1:1.5.

19. The process according to claim 7, wherein the catalyst component Cat 1 is selected from the group consisting of $M(OR_2')_x$, $M_2O_x$, $M(R_1'COO)_x$ and mixtures thereof,
the catalyst component Cat2 is selected from the group consisting of RE metal's inorganic halides $LnX_3$, carboxylates $Ln(R_1COO)_3$, alkoxides $Ln(OR_2)_3$, aryloxides $Ln(OAr)_3$, acetylacetonates $Ln(a_ca_c)_3$, hydrates thereof and mixtures thereof,
and, the molar ratio of Cat2/Cat1 is 5:95-100:0;
in which, X is a halogen ion, $a_ca_c$ is an acetylacetone group,
$R_1$ and $R_1'$ are $C_1$-$C_3$ alkyl, $R_1$, $R_1'$ being same or different,
$R_2$ and $R_2'$ are $C_3$-$C_6$ alkyl, $R_2$, $R_2'$ being same or different,
Ar is $C_1$-$C_4$ alkyl substituted phenyl, and
M is selected from the group consisting of metal Ti, Sb and Zn, and x is 2, 3 or 4.

20. The process according to claim 19, wherein the RE Ln is selected from the group consisting of La, Ce, Pr, Nd, Td, Yb, Dy, Sm, Sc and combinations thereof.

21. The process according to claim 20, wherein the RE Ln is selected from the group consisting of La, Ce, Pr, Nd, Sc and combinations thereof.

22. The process according to claim 19, wherein the catalyst component Cat 1 is selected from the group consisting of titanium alkoxide $Ti(OR_2')_x$, antimony acetate, zinc acetate, zinc oxides, antimony oxides, titanium oxides, mixtures thereof,
the catalyst component Cat2 is selected from the group consisting of RE inorganic halides $LnX_3$, alkoxides $Ln(OR_2)_3$, aryloxides $Ln(OAr)_3$, acetylacetonates $Ln(a_ca_c)_3$ excluding samarium acetylacetonate $Sm(a_ca_c)_3$, and mixtures thereof,
wherein, X is chlorine ion or bromine ion, $R_2$ is isopropyl, n-butyl or isopentyl, Ar is 2,6-di-tert-butyl-4-methylphenyl or 4-butylphenyl;
and, the molar ratio of Cat2/Cat1 is 1:3-3:1.

23. The process according to claim 22, wherein the Cat 1 is tetrabutyl orthotitanate, titanium isopropoxide, titanium dioxide, antimony trioxide, antimony acetate or zinc acetate,
and the molar ratio of Cat2/Cat1 is 2:3-3:2.

24. The process according to claim 7, wherein the catalyst component Cat1 is selected from the group consisting of tetrabutyl orthotitanate, titanium isopropoxide, titanium dioxide, antimony trioxide, antimony acetate, zinc acetate and mixtures thereof,
the catalyst component Cat2 is selected from the group consisting of RE inorganic halides $LnX_3$, carboxylates $Ln(R_1COO)_3$, alkoxides $Ln(OR_2)_3$, aryloxides $Ln(OAr)_3$, and mixtures thereof,
and, the molar ratio of Cat2/Cat1 is 2:3-3:2;

in which, the RE Ln is selected from the group consisting of La, Ce, Pr, Nd, Sc and combinations thereof, X is chlorine ion or bromine ion, $R_1$ is ethyl or propyl, $R_2$ is isopropyl, b-butyl or isopentyl, and Ar is 2,6-di-tert-butyl-4-methylphenyl or 4-butylphenyl.

25. The process according to claim 7, wherein the steps 1), 2) and 3) are carried out in the same autoclave.

26. The process according to claim 7, wherein no chain extender is added in any of the steps 1), 2) and 3).

* * * * *